May 29, 1928.
J. KOZELKA
1,671,767
SUPPORT FOR OUTLET BOXES AND THE LIKE
Filed Jan. 2, 1926
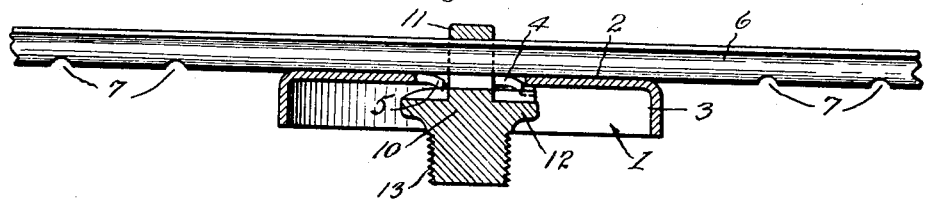
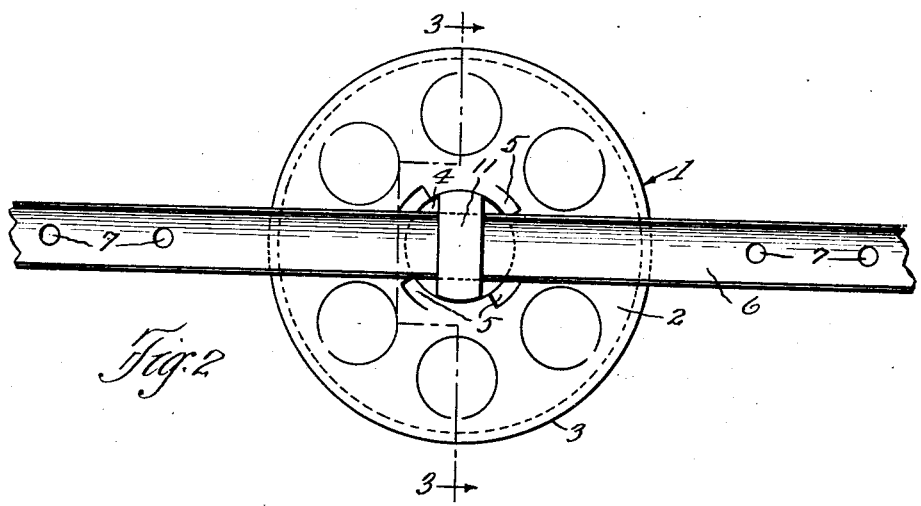
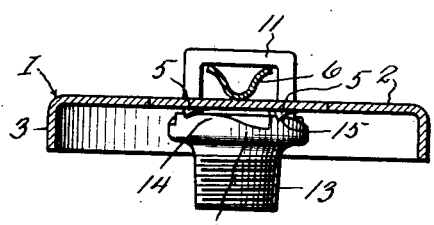
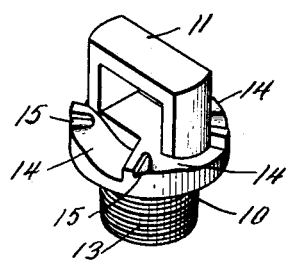
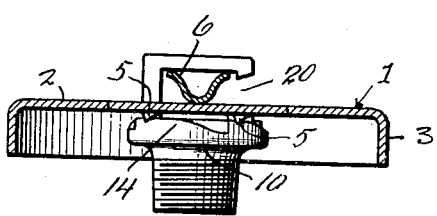
INVENTOR
Joseph Kozelka
By Hull, Brock & West
Attys.

Patented May 29, 1928.

1,671,767

UNITED STATES PATENT OFFICE.

JOSEPH KOZELKA, OF CLEVELAND, OHIO, ASSIGNOR TO THE NEW ERA ELECTRIC MANUFACTURING COMPANY, OF CLEVELAND, OHIO, A CORPORATION OF OHIO.

SUPPORT FOR OUTLET BOXES AND THE LIKE.

Application filed January 2, 1926. Serial No. 78,785.

This invention relates to improved means for supporting what are known as outlet boxes or receptacles that are used in the wiring of buildings or other structures for electric lights and the like.

Briefly, outlet boxes form the junctions between the adjacent sections of a conduit system through which the wires are run and provide access to the wiring at various points in the system for the purposes of making connections, directing the wires from one conduit section to another, and for installing fixtures. Ordinarily, the boxes are sustained by supporting bars that are secured to and extend between adjacent joists or studs of the structure. Suitable members, usually incorporating fixture supporting studs, are sometimes employed for connecting the outlet boxes or receptacles to the supporting bars, and it is to this feature of the outfit that my invention particularly relates.

The aim of the invention is to provide relatively cheap but thoroughly efficient means for connecting an outlet box or receptacle to a supporting bar in any adjusted position along the bar, the nature of the invention making it unnecessary to employ tools of any kind for securing the parts together, thus greatly facilitating the connection of the box or receptacle to the bar and thereby expediting the wiring operations.

More specific objects are to provide an outlet box having an aperture in one of its walls and tongues or depressions adjacent said aperture, and a member, preferably in the form of a fixture stud, having a yoke that is adapted to be extended through said aperture and incorporating cam parts for cooperation with said tongues or depressions whereby relative rotation between the box and member will tend to create axial movement of the member with respect to the box so that, when a supporting bar is extended through the yoke beyond the apertured wall of the box and the box is rotated with respect to the member it will clamp the parts firmly together. Also, to provide means for holding the outlet box and member against relative rotation when the parts are in clamped condition.

It is sometimes desirable to apply the outlet box or receptacle directly to a part of the bar intermediate its ends, as when the bar is already secured to joists, studs, or the like, or when the ends of the bar are so formed that the member cannot be engaged over the end of the bar and slid therealong to its final position. Another object of the invention, therefore, is to provide a member of the aforesaid character having an opening in a branch of its yoke through which the bar may enter the yoke in a direction transversely of the bar.

Other and more detailed objects of the invention will appear as this description proceeds wherein reference is made to the accompanying drawing. In the drawing, Fig. 1 shows an outlet box secured to a supporting bar by means of my invention, the box and attaching member being in central section; Fig. 2 is a plan view of the assembly shown in Fig. 1; Fig. 3 is a section on the line 3—3 of Fig. 2; Fig. 4 is a perspective view of the member through which the box is clamped to the supporting bar; and Fig. 5 is a view, similar to Fig. 3, of a modification.

The outlet box, designated 1, is, in general, of usual form, the one shown being of the shallow variety known as "pans". It is comprised of a circular wall 2 and a peripheral flange 3. The circular wall has a central aperture 4, and tongues or depressions 5 are struck from said wall about the aperture 4. 6 is a supporting bar, which may be of any suitable form, the one herein shown being constructed of sheet metal having the cross sectional shape disclosed in Figs. 3 and 5. The bar is provided adjacent its ends with holes 7 for the reception of nails or other fastening means by which it is adapted to be attached to joists, studs, or other structural elements.

The box is secured to the supporting bar by a member designated 10 which is comprised of a yoke 11, a base 12 and, in the present instance, a threaded fixture stud 13. The base 12 is formed with cams 14 for cooperation with the tongues or depressions 5, and each cam is shown as being provided with a locking notch 15.

In connecting the parts together, the yoke 11 is passed through the aperture 4, and the bar 6 is extended through the yoke. During this assembling of the parts, the tongues or depressions 5 are adjacent the "low" parts of the cams 14. The box is then adjusted along the bar to the desired location and is then rotated in a direction to cause the tongues or depressions to travel up the inclines of the cams and to finally snap into the locking notches 15, the tongues or depressions being sufficiently resilient to hold the parts under tension when the tongues occupy the notches. When the parts are in this condition the circular wall of the box is firmly clamped against the adjacent side of the supporting bar.

To facilitate application of the box to the bar, either after the bar has been installed or in a case where the ends of the bar are bent at such an angle with respect to its body portion that the yoke cannot be engaged over the end of the bar and moved longitudinally to a central position thereon, the yoke may be provided with an opening 20, as indicated in Fig. 5, through which the bar may enter the yoke in a direction transversely of the bar. In all other respects the modification shown in Fig. 5 is the same as that previously described.

Having thus described my invention, what I claim is:—

1. In combination, an outlet box having an aperture in one of its walls and tongues struck inwardly from said wall adjacent the aperture, a member comprised of a yoke that is adapted to be extended through said aperture and a base incorporating arcuate cam portions that are substantially concentric with respect to the axis of said member for cooperation with the aforesaid tongues whereby relative rotation between the member and box for a part of a revolution will effect axial movement of the member with respect to the box, and a supporting bar adapted to be extended through the yoke and clamped to the box by said member.

2. In combination, an outlet box having an aperture in one of its walls and resilient tongues struck inwardly from said wall adjacent the aperture, a member comprised of a yoke that is adapted to be extended through said aperture and a base incorporating arcuate cam portions that are substantially concentric with respect to the axis of said member for cooperation with the aforesaid tongues whereby relative rotation between the member and box for a part of a revolution will effect axial movement of the member with respect to the box, and a supporting bar adapted to be extended through the yoke and clamped to the box by said member, said cam portions being provided with locking notches into which the ends of the tongues are adapted to engage for yieldingly maintaining the outlet box against angular movement with respect to the member.

3. In combination, a receptacle having an aperture in one of its walls, a member having a part that is adapted to be freely extended through said aperture for holding engagement with and for adjustment along a supporting bar, the receptacle being rotatable upon said member and having therewith relatively yieldable parts co-acting to create axial movement of the member with respect to the receptacle upon relative rotation between the receptacle and said member whereby, upon a partial rotation of the receptacle with respect to the member, the receptacle will be clamped against the bar with the yielding parts under tension.

4. In combination, a receptacle having an aperture in one of its walls, a member having a part that is adapted to be freely extended through said aperture for holding engagement with and for adjustment along a supporting bar, the receptacle being rotatable upon said member and having therewith relatively yieldable parts co-acting to create axial movement of the member with respect to the receptacle upon relative rotation between the receptacle and said member whereby, upon a partial rotation of the receptacle with respect to the member, the receptacle will be clamped against the bar with the yieldable parts under tension, said parts serving, also, to maintain the receptacle in a given angular relation to the member.

5. In combination, a receptacle having an aperture in one of its walls and depressions adjacent said aperture, a member having a yoke that is adapted to be freely extended through said aperture and cam portions for cooperation with said depressions whereby relative rotation between the member and the receptacle will effect axial movement of the member with respect to the receptacle, and a supporting bar adapted to be extended through the yoke and clamped to the receptacle through the intervention of said member by a partial rotation of the receptacle with respect to the member.

6. In combination, an outlet box having an aperture in one of its walls and depressions adjacent said aperture, a member comprised of a yoke adapted to be extended through said aperture and a base incorporating cam portions for cooperation with said depressions whereby relative rotation between the member and box will effect axial movement of the member with respect to the box, and a supporting bar adapted to be extended through the yoke and clamped to the box through the intervention of the yoke by rotating the box a part of a revolution with respect to said member, the base being provided with locking parts wherewith the depressions are adapted to co-act for holding the box and member in a given position against relative rotation.

7. In combination, an outlet box having an aperture in one of its walls and resilient tongues depressed from said wall adjacent the aperture, a member comprised of a yoke that is adapted to be extended through said aperture and a base incorporating cam portions for cooperation with said tongues whereby relative rotation between the member and box will effect axial movement of the member with respect to the box, and a supporting bar adapted to be extended through the yoke and clamped to the box through the intervention of the yoke by rotating the box a part of a revolution with respect to said member, the cam portions having locking notches for the reception of said tongues.

In testimony whereof, I hereunto affix my signature.

JOSEPH KOZELKA.